(12) United States Patent
Nomura et al.

(10) Patent No.: US 11,966,195 B2
(45) Date of Patent: Apr. 23, 2024

(54) MINUTE-PARTICLE TRAPPING DEVICE AND IMAGE FORMING APPARATUS

(71) Applicant: FUJIFILM Business Innovation Corp., Tokyo (JP)

(72) Inventors: Yuka Nomura, Kanagawa (JP); Tetsuya Kawatani, Kanagawa (JP); Yutaka Nakayama, Kanagawa (JP); Kazunari Ishii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/989,496

(22) Filed: Nov. 17, 2022

(65) Prior Publication Data

US 2023/0393522 A1 Dec. 7, 2023

(30) Foreign Application Priority Data

Jun. 3, 2022 (JP) ................................. 2022-090966

(51) Int. Cl.
| | | |
|---|---|---|
| G03G 21/00 | (2006.01) | |
| B01D 46/00 | (2022.01) | |
| B01D 46/24 | (2006.01) | |
| B01D 46/52 | (2006.01) | |
| B01D 46/62 | (2022.01) | |
| F24F 8/00 | (2021.01) | |
| F24F 8/108 | (2021.01) | |
| G03G 15/20 | (2006.01) | |
| G03G 21/20 | (2006.01) | |

(52) U.S. Cl.
CPC ....... *G03G 21/206* (2013.01); *B01D 46/2418* (2013.01); *B01D 46/521* (2013.01); *B01D 46/62* (2022.01); *F24F 8/108* (2021.01); *G03G 15/2017* (2013.01); *G03G 2221/1645* (2013.01)

(58) Field of Classification Search
CPC ............ G03G 15/2017; G03G 21/206; G03G 2221/1645; B41J 29/377; B01D 46/2418; B01D 46/521; B01D 46/62; F24F 7/06; F24F 7/065; F24F 8/108
USPC ......................................................... 399/93
See application file for complete search history.

(56) References Cited

U.S. PATENT DOCUMENTS

| | | | |
|---|---|---|---|
| 10,877,436 B2 | 12/2020 | Kabata et al. | |
| 11,106,177 B1 | 8/2021 | Nomura et al. | |
| 2017/0128870 A1* | 5/2017 | Schmitt | B01D 46/521 |
| 2018/0250621 A1* | 9/2018 | Scholz | B01D 46/521 |

(Continued)

FOREIGN PATENT DOCUMENTS

| | | |
|---|---|---|
| JP | 5404552 B2 | 2/2014 |
| JP | 2015-175873 A | 10/2015 |

(Continued)

*Primary Examiner* — Robert B Beatty
(74) *Attorney, Agent, or Firm* — Oliff PLC (57) ABSTRACT

A minute-particle trapping device includes: an air duct having a duct space through which air containing minute particles flows; a first filter disposed to block the duct space in the air duct and having a honeycomb structure to trap the minute particles contained in the air; and a second filter disposed in the air duct at a position downstream from the first filter in an air flow direction to block the duct space, the second filter being formed from a nonwoven fabric folded in a wave pattern to trap minute particles contained in the air that has passed through the first filter.

15 Claims, 8 Drawing Sheets

(56) References Cited

U.S. PATENT DOCUMENTS

| | | | | |
|---|---|---|---|---|
| 2019/0247775 A1* | 8/2019 | Schuld | ............... | B01D 46/0032 |
| 2020/0019102 A1* | 1/2020 | Noguchi | ............ | G03G 15/5016 |
| 2020/0019117 A1* | 1/2020 | Nomura | ............... | G03G 21/206 |
| 2020/0050144 A1 | 2/2020 | Kabata et al. | | |
| 2021/0294262 A1 | 9/2021 | Nomura et al. | | |
| 2022/0105457 A1* | 4/2022 | Knappenberger | . | B01D 39/1692 |
| 2023/0021525 A1* | 1/2023 | Fujita | ................. | G03G 15/0291 |

FOREIGN PATENT DOCUMENTS

| | | | | | |
|---|---|---|---|---|---|
| JP | 2018-049189 A | | 3/2018 | | |
| JP | 2020-027158 A | | 2/2020 | | |
| JP | 2021-148904 A | | 9/2021 | | |
| KR | 2009038870 A | * | 4/2009 | ......... | B01D 46/0023 |
| KR | 2014033828 A | * | 3/2014 | | |
| KR | 2020145327 A | * | 12/2020 | | |

* cited by examiner

| EXISTENCE/ABSENCE OR TYPE OF FIRST FILTER | BASE | NUMBER OF CELLS IN HONEYCOMB STRUCTURE | THICKNESS D1 (mm) | QUANTITY (PIECES) OF UFPS | UFP TRAPPING RATE (%) |
|---|---|---|---|---|---|
| NONE | — | — | — | 3.68E+11 | 0 |
| FILTER 1 | ALUMINUM | 600 | 15 | 2.28E+11 | 38 |
| FILTER 2 | PAPER | 600 | 10 | 2.40E+11 | 35 |
| FILTER 3 | PAPER | 430 | 10 | 2.47E+11 | 33 |
| FILTER 4 | ALUMINUM | 600 | 15 | 2.30E+11 | 38 |

MINUTE-PARTICLE TRAPPING DEVICE AND IMAGE FORMING APPARATUS

CROSS-REFERENCE TO RELATED APPLICATIONS

This application is based on and claims priority under 35 USC 119 from Japanese Patent Application No. 2022-090966 filed Jun. 3, 2022.

BACKGROUND

(i) Technical Field

The present disclosure relates to a minute-particle trapping device and an image forming apparatus.

(ii) Related Art

Japanese Unexamined Patent Application Publication No. 2021-148904 (claim 1 and FIG. 3) describes a minute-particle trapping device including an air duct having a duct space through which air containing minute particles flows, and a trapping member disposed to block the duct space in the air duct to trap the minute particles contained in the air. A plate-like ventilation member having a honeycomb structure including greater than or equal to 600 and smaller than or equal to 1400 cells per square inch is used as an example of the trapping member.

Japanese Patent No. 5404552 (claim 1, paragraph 0027, and FIG. 2) describes an image forming apparatus including a wall path defined by a rear cover and an exhaust duct to discharge cooling air discharged from a fixing portion to the outside of an apparatus body, a filter unit including a silicone-oil impregnated filter impregnated with silicone oil and disposed along an air path, and an activated-charcoal filter disposed at the filter unit near the portion where the cooling air is discharged and near an exit of the air path. Japanese Patent No. 5404552 (claim 1, paragraph 0027, and FIG. 2) also describes that the filter unit faces an opening formed in the rear cover to be removably attached to an outer surface of the rear cover. Japanese Patent No. 5404552 (claim 1, paragraph 0027, and FIG. 2) also describes the silicone-oil impregnated filter having a shape such as a honeycomb shape or a web shape.

Japanese Unexamined Patent Application Publication No. 2020-27158 (claims 1, 7, and 8 and FIG. 2) describes, for example, a minute-particle trapping device that includes an ozone exhaust path through which ozone produced by an ozone producing portion is discharged, an air exhaust path through which hot air produced by a hot-air producing portion is discharged, a merging exhaust path where the ozone exhaust path and the air exhaust path merge at their downstream sides, a volatile-organic-compound (VOC) filter that is disposed in the air exhaust path at a portion other than the merging exhaust path to trap volatile organic compounds (VOC), and an electrostatic filter disposed at a portion of the merging exhaust path. Japanese Unexamined Patent Application Publication No. 2020-27158 (claims 1, 7, and 8 and FIG. 2) describes a charging device as an example of the ozone producing portion, and a fixing device as an example of the hot-air producing portion.

SUMMARY

Aspects of non-limiting embodiments of the present disclosure relate to a minute-particle trapping device capable of trapping more ultrafine particles than a structure that includes one filter to trap ultrafine particles with 100 nm or smaller, and an image forming apparatus including the trapping device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a minute-particle trapping device including: an air duct having a duct space through which air containing minute particles flows; a first filter disposed to block the duct space in the air duct and having a honeycomb structure to trap the minute particles contained in the air; and a second filter disposed in the air duct at a position downstream from the first filter in an air flow direction to block the duct space, the second filter being formed from a nonwoven fabric folded in a wave pattern to trap minute particles contained in the air that has passed through the first filter.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below.

First Exemplary Embodiment

Figure 1:
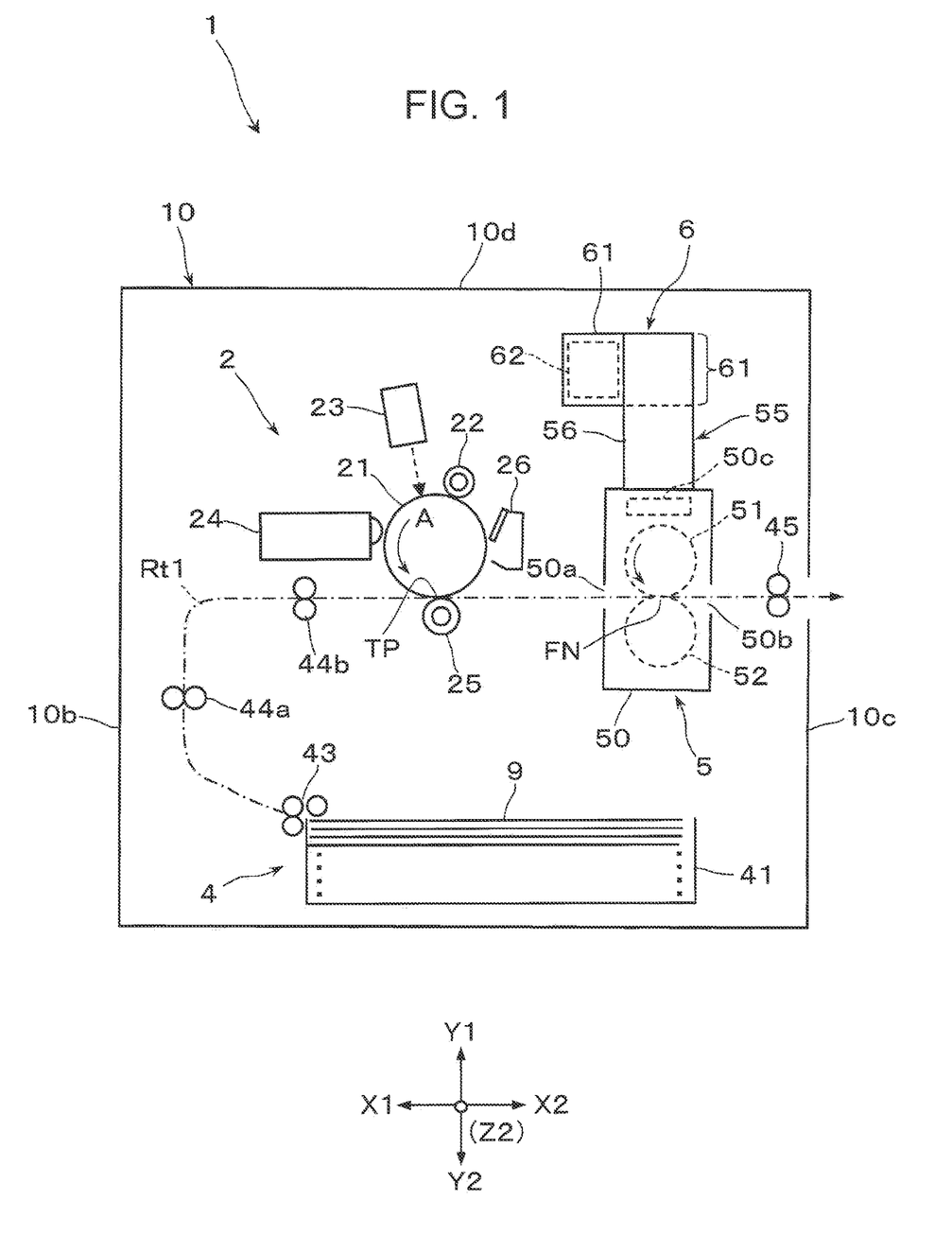
FIG. 1 is a schematic diagram of an image forming apparatus including a minute-particle trapping device according to a first exemplary embodiment.
Figure 2:
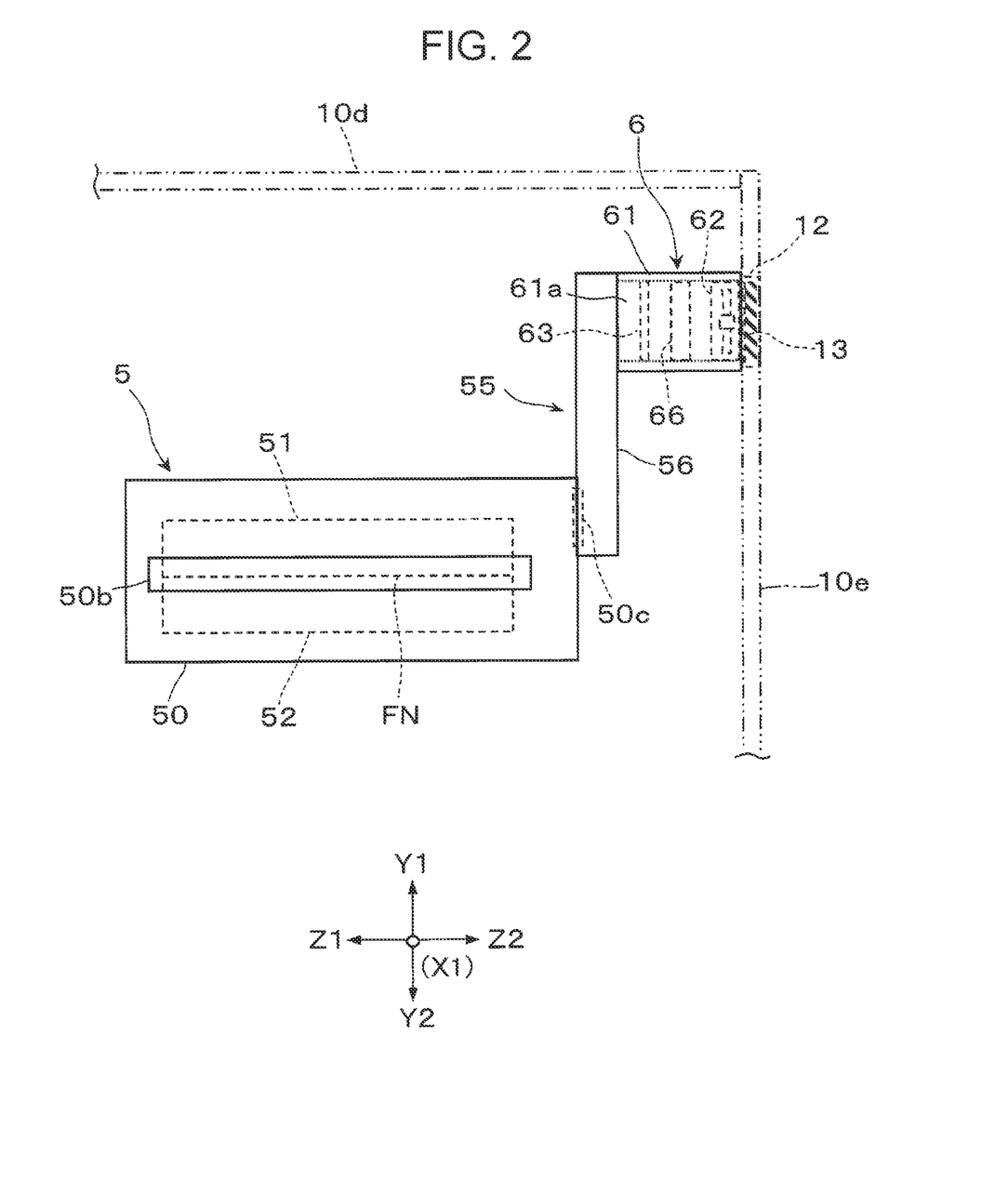
FIG. 2 is a schematic diagram of a fixing device and the minute-particle trapping device in the image forming apparatus in FIG. 1.

FIG. 1 and FIG. 2 illustrate a minute-particle trapping device and an image forming apparatus according to a first exemplary embodiment of the present disclosure. FIG. 1 is a schematic diagram of the image forming apparatus, and FIG. 2 is a schematic diagram of a fixing device and a minute-particle trapping device in the image forming apparatus.

Arrows indicated with X, Y, and Z in the drawings including FIG. 1 denote left and right (X1 and X2), top and bottom (Y1 and Y2), and front and rear (Z1 and Z2) directions with reference to FIG. 1. A circle at a junction of arrows in each drawing indicates that the direction of arrow denoted with the parenthesized reference sign points downward in the plane of the drawing.

Image Forming Apparatus

An image forming apparatus 1 illustrated in FIG. 1 is, for example, an apparatus that forms images with an electrophotographic system on sheets 9 serving as examples of a recording medium. The image forming apparatus 1 forms, for example, images corresponding to image information input from an external connection device such as an information terminal. At this time, image information is information relating to images to be formed, such as characters, drawings, photographs, or patterns.

As illustrated in FIG. 1, the image forming apparatus 1 includes a housing 10 as an example of an apparatus body, and accommodates, inside the housing 10, components including an image forming device 2, a sheet feeding device 4, a fixing device 5, and a minute-particle trapping device 6.

The housing 10 is formed from components such as a support member and an exterior member, and has a predetermined shape and structure. An arrowed dot-and-dash line in the drawings such as FIG. 1 indicates a transport path along which the sheets 9 are transported in the housing 10.

The image forming device 2 is a device that forms toner images based on the image information with toner serving as a developer, and transfers the images to the sheets 9.

The image forming device 2 includes a photoconductor drum 21 serving as an example of an image carrier that rotates in a direction of arrow A, and components including a charging device 22, an exposure device 23, a developing device 24, a transfer device 25, and a cleaning device 26 arranged around the photoconductor drum 21.

The charging device 22 is a device that charges an outer peripheral surface (image receivable surface) of the photoconductor drum 21 with a predetermined surface potential. The charging device 22 includes, for example, a charging member such as a roller that is brought into contact with an image forming area of the outer peripheral surface of the photoconductor drum 21 and to which a charging electricity is provided.

The exposure device 23 is a device that exposes the charged outer peripheral surface of the photoconductor drum 21 with light based on the image information to form an electrostatic latent image. The exposure device 23 operates upon receipt of an image signal generated as a result of, for example, an image processing member not illustrated performing a predetermine process on the image information input from the exterior.

The developing device 24 develops an electrostatic latent image formed on the outer peripheral surface of the photoconductor drum 21 with a developer (toner) of a corresponding predetermined color (such as black) to visualize the latent image as a monochrome toner image.

The transfer device 25 is a device that electrostatically transfers the toner image formed on the outer peripheral surface of the photoconductor drum 21 to the sheet 9. The transfer device 25 includes a transfer member such as a roller that comes into contact with the outer peripheral surface of the photoconductor drum 21 and to which a transfer current is provided.

The cleaning device 26 is a device that removes, by scratching, undesired substances such as unwanted toner or paper dust that adheres to the outer peripheral surface of the photoconductor drum 21 to clean the outer peripheral surface of the photoconductor drum 21.

In the image forming device 2, a portion where the photoconductor drum 21 and the transfer device 25 face each other serves as a transfer position TP where a toner image is transferred.

The sheet feeding device 4 is a device that accommodates the sheets 9 to be fed to the transfer position TP in the image forming device 2, and that dispatches the sheets 9. The sheet feeding device 4 includes, for example, a container 41 that accommodates the sheets 9 and a dispatch device 43 that dispatches the sheets 9.

The container 41 is a structure that includes a mount board, not illustrated, that receives and accommodates the multiple sheets 9 of a predetermined size in a predetermined orientation. The container 41 is attached to the housing 10 while being drawable to the outside of the housing 10 for enabling, for example, replenishment of the sheets 9. The dispatch device 43 is a device that picks up the sheets 9 mounted on the mount board of the container 41 one by one with pick-up devices such as multiple rollers.

The sheets 9 may be any recording media transportable in the housing 10, such as ordinary paper sheets, coated paper sheets, or cardboard sheets that allow toner images to be transferred and fixed thereto, and may be formed from any material or may have any shape.

The fixing device 5 is a device that fixes a toner image transferred at the transfer position TP of the image forming device 2 to the sheet 9. The fixing device 5 includes components including a heating rotator 51 and a pressing rotator 52 arranged in the internal space of a housing 50 having an entry port 50a and an exit port 50b for the sheets 9.

The heating rotator 51 is a rotator in a roller form or a belt-pat form that rotates in the direction indicated with an arrow. The heating rotator 51 is heated by a heating member, not illustrated, to keep the outer surface at a predetermined temperature. The pressing rotator 52 is a rotator in a roller form or a belt-pat form that rotates while being in contact with the heating rotator 51 with a predetermined pressure. The pressing rotator 52 may be any member heated by a heating member.

In the fixing device 5, the portion where the heating rotator 51 and the pressing rotator 52 come into contact with each other is formed as a fixing processing portion (nip portion) FN that performs a process such as heating or pressing to fix an unfixed toner image to the sheet 9.

A dot-and-dash line denoted with a reference sign Rt1 in FIG. 1 is a sheet-feeding transport path along which the sheets 9 in the sheet feeding device 4 are transported to the transfer position TP. The sheet-feeding transport path Rt1 includes multiple transport rollers 44a and 44b that hold and transport the sheets 9 and multiple guide members not illustrated that secure the transportation space for the sheets 9 and guide the transported sheets 9.

The image forming apparatus 1 performs an image forming operation, for example, in the following manner.

Specifically, in the image forming apparatus 1, when a controller not illustrated receives a command for performing an operation of forming an image, the image forming device 2 performs operations including a charging operation, an exposure operation, a development operation, a transfer operation, and a cleaning operation, whereas the sheet feeding device 4 performs an operation of feeding the sheets 9 to the transfer position TP. Thus, the image forming apparatus 1 forms a toner image on the photoconductor drum 21, and transfers the toner image to the sheet 9 fed to the transfer position TP from the sheet feeding device 4.

Subsequently, in the image forming apparatus 1, the fixing device 5 performs the fixing operation where the sheet 9 to which the toner image is transferred is introduced to the nip portion FN, and passes through the nip portion FN. Thus, the image forming apparatus 1 fixes the unfixed toner image to the sheet 9. The sheet 9 undergoing the fixing operation is discharged by, for example, discharging rollers 45 to a container, not illustrated, disposed outside of the housing 10 to be accommodated in the container.

With the above described operations, a basic image forming operation performed by the image forming apparatus 1 on a single side of the sheet 9 is finished.

As illustrated in, for example, FIG. 1 and FIG. 2, the image forming apparatus 1 includes a vent mechanism 55 serving as an example of a vent member or a first vent member that collects air in, for example, the housing 50 in the fixing device 5, and discharges air to the outside of the housing 10 in the image forming apparatus 1.

Figure 3:
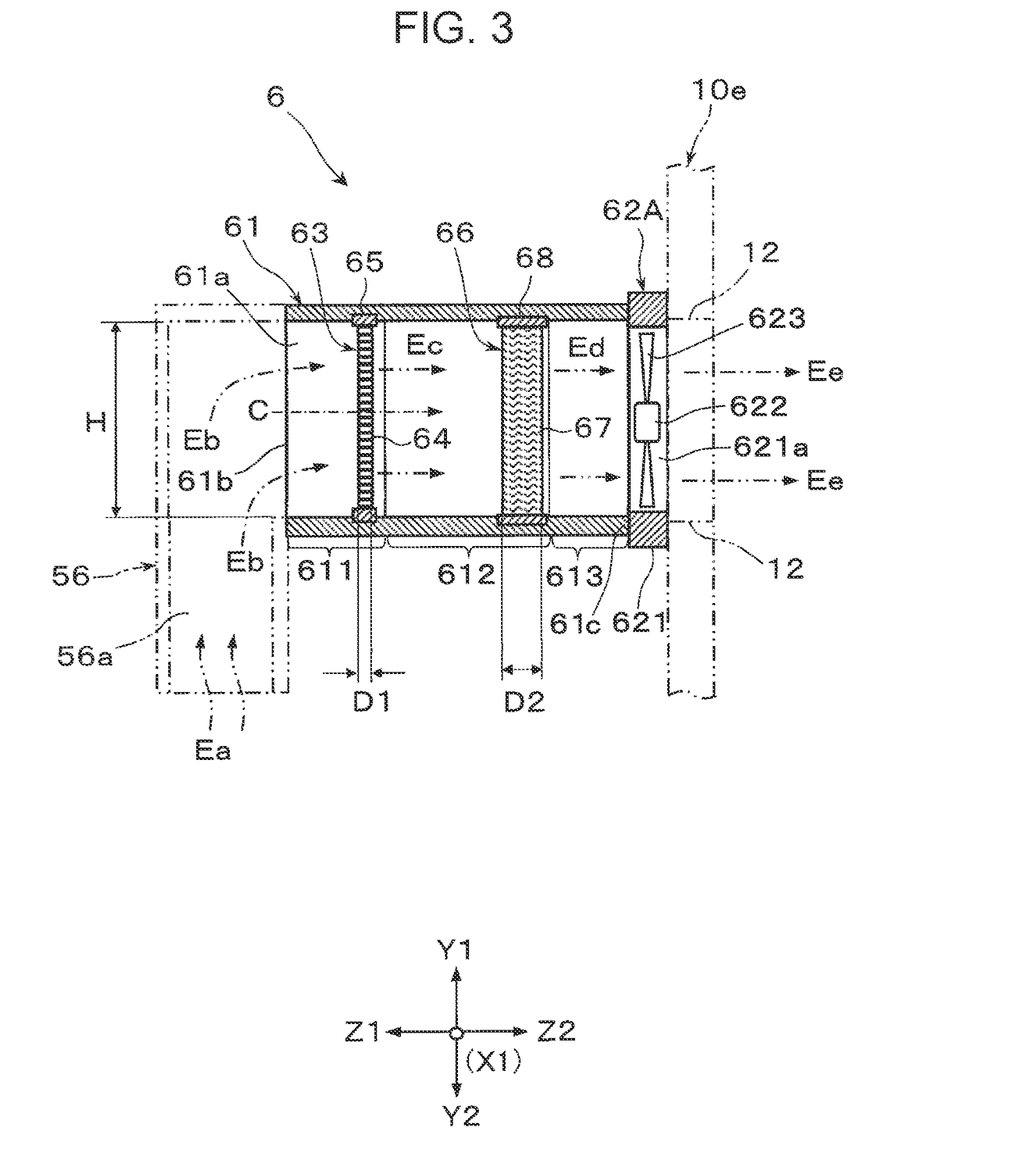
FIG. 3 is a schematic diagram of the minute-particle trapping device viewed from a side.

The vent mechanism 55 includes a collecting duct 56 that collects air in, for example, the fixing device 5. As illustrated in FIG. 2 or FIG. 3, the collecting duct 56 is an air duct including a duct space 56a into which air is collected and in which the collected air flows.

The collecting duct 56 has a first end portion connected to an air exit port 50c in the housing 50 in the fixing device 5 disposed at, for example, a portion of the side surface. The air exit port 50c is disposed at, for example, a portion of the housing 50 above the entry port 50a and the exit port 50b for the sheet 9.

The collecting duct 56 has a second end portion extending toward an air outlet 12 in a rear surface 10e in the housing 10 in the image forming apparatus 1. The collecting duct 56 extends upward from the air exit port 50c while slipping through an excess gap in the housing 10, and then extends toward the rear surface 10e of the housing 10.

The collecting duct 56 according to the first exemplary embodiment has a rear end portion (rear half) serving as an air duct 61 in the minute-particle trapping device 6 described later.

As illustrated in FIG. 2, the housing 10 has an upper surface 10d, and a louver 13 or a breathable protection board is attached to the air outlet 12.

Minute-Particle Trapping Device

The minute-particle trapping device 6 is a device that traps minute particles caused by the fixing device 5 and its periphery.

As illustrated in, for example, FIG. 1 to FIG. 4, the trapping device 6 includes components including the air duct 61, an air-current producing member 62, a first filter 63, and a second filter 66.

The minute particles trapped by the trapping device 6 are ultrafine particles (UFPs) mostly having a particle size of smaller than or equal to 100 nm (0.1 µm).

The trapping device 6 traps ultrafine particles contained in minute particles (coarse particulate) generated as a result of, for example, a component in toner such as wax volatilizing due to heat applied during the fixing operation and then being cooled.

The air duct 61 is a tubular structure having a duct space 61a through which air containing minute particles flows.

The air duct 61 according to the first exemplary embodiment is an angular tube having the duct space 61a with a substantially rectangular cross section.

As illustrated in FIG. 1 to FIG. 3, the air duct 61 has a first end portion 61b connected to the collecting duct 56 in the vent mechanism 55 in the fixing device 5, and has a second end portion 61c directly or indirectly connected to the air outlet 12 in the rear surface 10e of the housing 10. The case where the second end portion 61c of the air duct 61 is indirectly connected to the air outlet 12 is, for example, a case where the second end portion 61c is connected to the air outlet 12 through the air-current producing member 62 disposed near the air outlet 12.

Figure 5A:
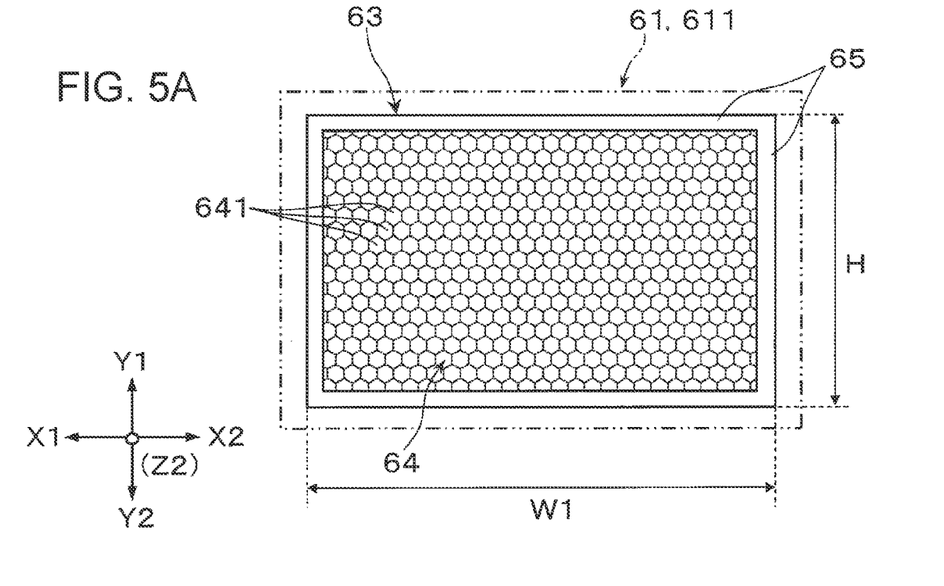
FIG. 5A is a schematic diagram of components including a first filter.
Figure 5B:
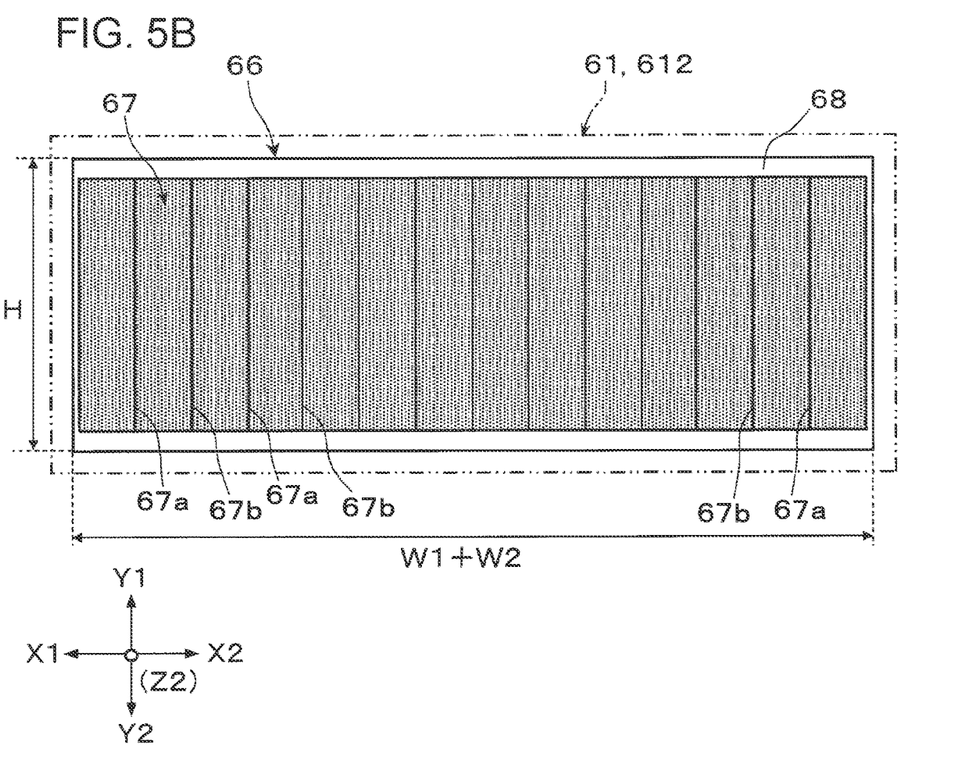
FIG. 5B is a schematic diagram of a second filter.

As illustrated in FIG. 3 or FIG. 5, the air duct 61 has such a shape that a height H of the duct space 61a is substantially uniform from the first end portion 61b to the second end portion 61c.

Figure 4:
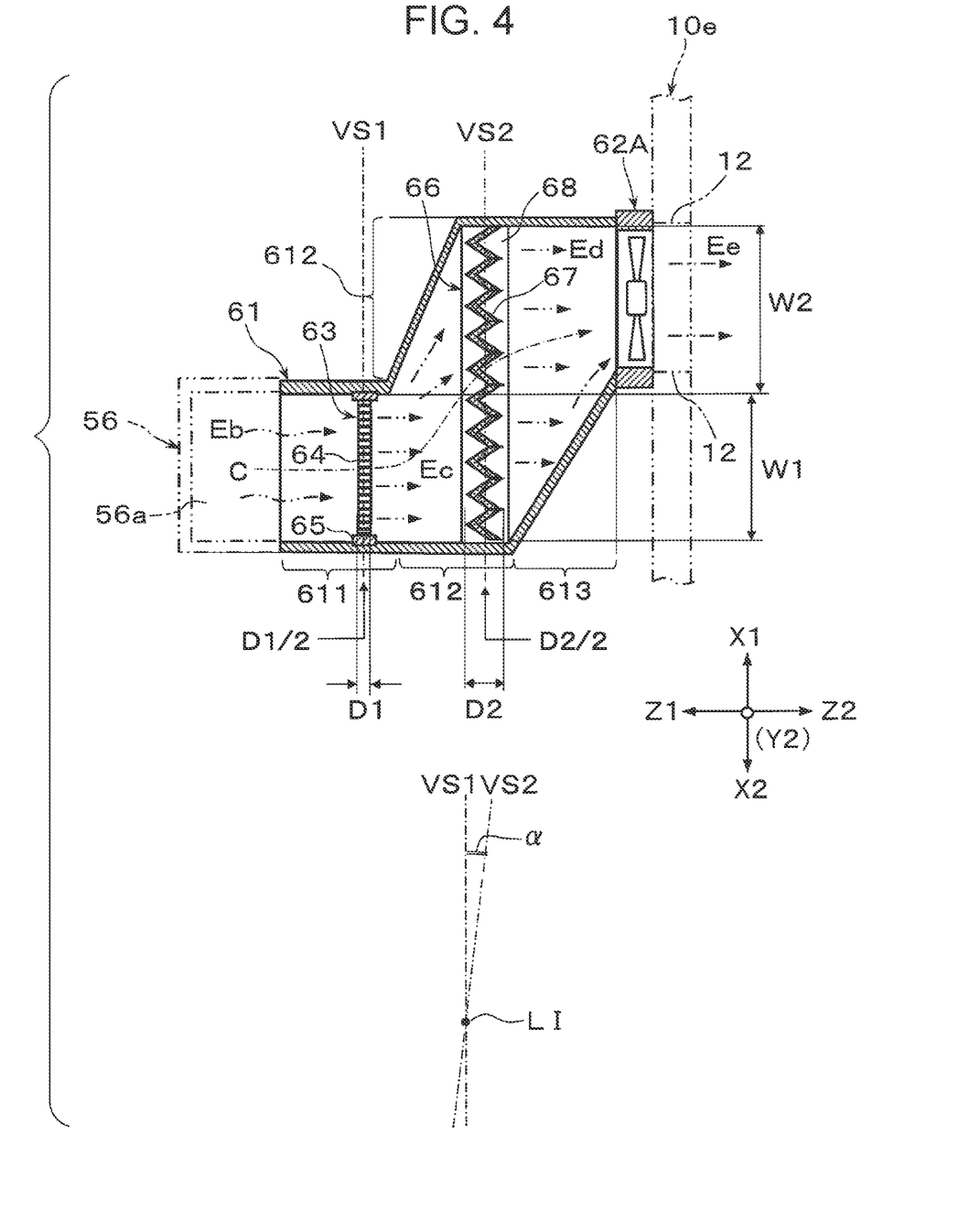
FIG. 4 is a schematic diagram of the minute-particle trapping device viewed from the top.

As illustrated in FIG. 4, when viewed from above, the air duct 61 is disposed to allow, for example, the collecting duct 56 in the vent mechanism 55 and the air outlet 12 to be misaligned with each other in a direction of arrow X1. Thus, the air duct 61 has a shape of a combination of three portions.

Specifically, the air duct 61 includes an upstream portion 611, which is a portion of the duct space 61a extending straight to the downstream side from the first end portion 61b while having a substantially uniform width W1, a midstream portion 612, which is a portion of the duct space 61a extending from the upstream portion 611 while increasing the width by a width W2 in a direction indicated with arrow X1, and a downstream portion 613, which is a portion of the duct space 61a extending from the midstream portion 612 while being gradually narrowed in a direction indicated with arrow X1 to the downstream side in an air flow direction C.

The air-current producing member 62 is a member that produces an air current in the air flow direction C inside the duct space 61a in the air duct 61.

As illustrated in, for example, FIG. 3, in the first exemplary embodiment, an axial-flow fan 62A is used as the air-current producing member 62. As illustrated in, for example, FIG. 3, the axial-flow fan 62A includes a frame portion 621 including a through portion 621a with a circular cross section, a shaft portion 622 rotatably supported in the through portion 621a in the frame portion 621 and including a driving motor, not illustrated, installed therein, and multiple blades 623 that stand around the shaft portion 622.

As illustrated in FIG. 2 or FIG. 3, the air-current producing member 62 is located downstream from the second filter 66 in the air duct 61 in the air flow direction C.

The air-current producing member 62 is located in the duct space 61a in the second end portion 61c in the air duct 61, or connected to the second end portion 61c. The air-current producing member 62 is spaced a predetermined distance apart from the second filter 66.

The airflow rate at which the air-current producing member 62 generates airflow may be set based on the following viewpoints. The airflow rate is set as appropriate in terms of, for example, preventing a secondary problem such as a temperature rise, condensation, or an increase in operation noise in the housing 10 in the image forming apparatus 1 (particularly, in the housing 50 in the fixing device 5 in this example) or securing preferable trapping performance of the second filter 66. Preferably, for example, the airflow rate of the airflow is set to be higher than or equal to 0.2 m³/min and lower than or equal to 1.0 m³/min on the side of the first filter 63 from which air flows in. The airflow rate exceeding 1.0 m³/min may increase the airflow rate of air that passes through the second filter 66 to degrade the trapping efficiency, or increase the operation noise of the air-current producing member 62.

The first filter 63 is a filter having a honeycomb structure that traps minute particles contained in air flowing in the duct space 61a in the air duct 61.

The first filter 63 is disposed to cross and block the duct space 61a in the air duct 61 at a position upstream from the second filter 66 in the air flow direction C. The first filter 63 according to the first exemplary embodiment is disposed at the downstream end of the duct space 61a in the upstream portion 611 in the air duct 61 to be substantially perpendicular to the duct space 61a that extends straight.

The first filter 63 includes a rectangular-plate-shaped honeycomb structure member 64 with, for example, a rectangular profile, and a frame member 65 that holds the honeycomb structure member 64 to be in a substantially flat state.

The honeycomb structure member 64 is a breathable member including a two-dimensional array of multiple through cells 641. The cells 641 correspond to constitutional repeating units of the honeycomb structure, and have a tubular hollow structure. The cells 641 have a cross section of a regular hexagonal, but may have a cross section of a triangle, a quadrangle, or a shape defined by wavy lines and straight lines that touch the upper portions of the wavy lines (corrugated honeycomb).

The first filter 63 may have any number of cells 641 per square inch in the honeycomb structure of the honeycomb structure member 64. Preferably, the number of cells 641 is set to be within a range of greater than or equal to 300 and smaller than or equal to 800.

When the number of cells 641 is smaller than 300, the surface area is reduced, the performance of trapping ultrafine particles is reduced, and the function of correcting the flow direction of air that passes through the cells 641 is reduced. In contrast, when the number of cells 641 exceeds 800, pressure drop increases and is less likely to be reduced.

In the first filter 63, the honeycomb structure member 64 may have any thickness D1. Preferably, the thickness D1 is set to be within a range of greater than or equal to 5 mm and smaller than or equal to 20 mm, or more preferably, within a range of greater than or equal to 5 mm and smaller than or equal to 15 mm.

The thickness D1 is a dimension in the direction in which the cells 641 extend through. When the thickness D1 is smaller than 5 mm, the function of correcting the flow direction of air that passes through the cells 641 is reduced. In contrast, when the thickness D1 exceeds 20 mm, the pressure drop is less easily reduced. From the latter point of view, when the thickness D1 is smaller than or equal to 15 mm, the pressure drop is easily reduced.

The first filter 63 (the honeycomb structure member 64) is formed from a metal material such as aluminium or paper such as inorganic fiber paper.

The honeycomb structure member 64 formed from paper may be manufactured at lower costs than the honeycomb structure member 64 formed from a metal material, and thus reduce costs.

When the honeycomb structure member 64 is formed from paper, a material such as active carbon for improving or adding the trapping efficiency or other capabilities may adhere to the paper material or the paper surface. When, for example, having active carbon adhering thereto, the honeycomb structure member 64 is capable of trapping ozone or volatile organic compounds (VOC) contained in air.

The second filter 66 is a filter formed from a nonwoven fabric to trap minute particles contained in air flowing in the duct space 61a in the air duct 61, particularly, ultrafine particles.

As illustrated in FIG. 4, the nonwoven fabric for the second filter 66 has a shape folded in a wave pattern, or a pleated shape. Thus, the nonwoven fabric for the second filter 66 has a larger surface area for touching air than a flat nonwoven fabric if they are disposed in the same duct space 61a.

The second filter 66 is disposed to cross and block the duct space 61a in the air duct 61 at a portion a predetermined distance downstream from the first filter 63 in the air flow direction C.

The second filter 66 according to the first exemplary embodiment is disposed in the duct space 61a in the air duct 61 at a position upstream from the air-current producing member 62 in the air flow direction C.

The second filter 66 is disposed at a downstream end of the duct space 61a in the midstream portion 612 in the air duct 61.

The second filter 66 includes a nonwoven fabric 67 with a wavily folded sheet shape, and a frame member 68 that holds the nonwoven fabric 67.

The nonwoven fabric 67 is a sheet with a predetermined thickness and formed from a material such as natural fiber or artificial fiber particularly suitable for trapping ultrafine particles.

As illustrated in FIG. 4 or FIG. 5B, when viewed from the upstream side in the air flow direction C, the folded nonwoven fabric 67 has a shape including a predetermined number of patterns, each including a protrusion (mountain) 67a protruding to the upstream side and a recess (valley) 67b recessed to the downstream side, at substantially regular intervals.

The nonwoven fabric 67 in the second filter 66 folded in a wave pattern may have any thickness D2, but preferably, the thickness D2 is set to be within a range of greater than or equal to 15 mm and smaller than or equal to 20 mm.

As illustrated in, for example, FIG. 4, the thickness D2 is a dimension corresponding to a distance (a difference of altitude) between the outermost portion of the protrusion (the mountain) 67a and the outermost portion of the recess (the valley) 67b in the nonwoven fabric 67 folded in a wave pattern. When the thickness D2 is smaller than the lower limit, the surface area of the filter is reduced, and the trapping efficiency is less easily improved. In contrast, when the thickness D2 exceeds the upper limit, the pressure drop is more likely to rise.

Preferably, the thickness of the nonwoven fabric 67 itself is, for example, greater than or equal to 0.5 mm and smaller than or equal to 3.0 mm.

As illustrated in FIG. 4, the first filter 63 and the second filter 66 in the trapping device 6 are arranged to have a such relationship that, when virtual planes VS1 and VS2 that extend through the respective centers of the thicknesses D1 and D2 are translated in parallel toward each other, the virtual planes VS1 and VS2 form a crossing angle α of greater than 0° and smaller than or equal to 30° (absolute value). A reference sign LI at the lower portion in FIG. 4 indicates intersection lines (strictly, a point of intersection lines) when the virtual planes VS1 and VS2 are moved toward each other and cross each other.

The first filter 63 and the second filter 66 according to the first exemplary embodiment are arranged to form the crossing angle α of substantially 0°, or in other words, to be substantially parallel to each other.

When the crossing angle α exceeds 30°, air that has passed through the first filter 63 obliquely comes into contact with and passes through the second filter 66.

More specifically, in this case, air that has passed through the first filter 63 passes through the second filter 66 while more likely touching part of the wavily folded surface of the second filter 66, more specifically, one of surfaces adjacent to each protrusion 67*a* in between. Thus, the entire surface of the second filter 66 is not evenly used, and the second filter 66 is more likely to lower the efficiency of trapping ultrafine particles.

As illustrated in FIG. 4 or FIGS. 5A and 5B, the air duct 61 in the trapping device 6 increases its cross section (=height H×width W) of the duct space 61*a* from the first filter 63 to the second filter 66 as it extends to the second filter 66.

As described above, the air duct 61 according to the first exemplary embodiment includes the upstream portion 611 and the midstream portion 612 that is enlarged from the upstream portion 611 in a direction indicated with arrow X1. The first filter 63 is arranged at the upstream portion 611 in the air duct 61, and the second filter 66 is arranged at the midstream portion 612 in the air duct 61.

Thus, in the first exemplary embodiment, the cross section of the duct space 61*a* in the upstream portion 611 in which the first filter 63 is arranged is an area expressed as H×W1. On the other hand, the cross section of the duct space 61*a* in the midstream portion 612 in which the second filter 66 is arranged is expressed as H×(W1+W2). The cross section of the duct space 61*a* in the midstream portion 612 is greater than the cross section of the duct space 61*a* in the upstream portion 611.

As illustrated in FIG. 4, the air-current producing member 62 in the trapping device 6 is located at the position downstream from the second filter 66 in the air duct 61 in the air flow direction C on an elongated side of the second filter 66 while being misaligned with the first filter 63.

In the first exemplary embodiment, the air-current producing member 62 is located on the side of the second filter 66 elongated in a direction indicated with arrow X1 while being misaligned with the first filter 63.

In the air duct 61 according to the first exemplary embodiment, the downstream portion 613 has the duct space 61*a* that is gradually narrowed toward the elongated side to correspond to the one-sided positioning of the air-current producing member 62.

As indicated with dot-and-dash arrows in FIG. 4, the one-sided positioning of the air-current producing member 62 and the shape of the downstream portion 613 in the air duct 61 bend air flowing in the air duct 61 having a shape elongated in one direction in the middle to flow following, to some extent, the elongated side of the second filter 66 after passing through the first filter 63. Thus, air Ec that has passed through the first filter 63 less unevenly touches the entire area of the second filter 66, and easily flows therethrough.

The first filter 63 and the second filter 66 are preferably, but not necessarily, removable from, for example, the air duct 61 to be replaceable. Thus, the first filter 63 and the second filter 66 may be removed to be cleaned or to be replaced with new ones.

Operation of Trapping Device

The minute-particle trapping device 6 at least operates, for example, in a period while the fixing device 5 is in operation or a predetermined period after the fixing device 5 is stopped.

Specifically, the air-current producing member 62 in the trapping device 6 is actuated when the operation period comes, and, as illustrated in FIG. 3, an air current that flows in a direction indicated with arrow C in the duct space 61*a* in the air duct 61 occurs.

At this time, the duct space 61*a* in the air duct 61 is placed under a negative pressure as a result of the air-current producing member 62, disposed at the downstream end of the air duct 61 in the air flow direction C, exerting a force of sucking air in the duct space 61*a*.

Thus, air Ea containing minute particles mostly caused in the fixing operation performed by the fixing device 5 is collected to the collecting duct 56 in the vent mechanism 55, is moved toward the air duct 61, and then flows into the duct space 61*a* in the air duct 61 by being sucked.

Subsequently, as illustrated in FIG. 3 or FIG. 4, air Eb that has flowed into the duct space 61*a* in the upstream portion 611 in the air duct 61 is caused to pass through the first filter 63.

At this time, the air Eb moves while colliding against the honeycomb structure member 64 in the first filter 63 and passing through the cells 641 of the honeycomb structure.

Thus, at least a subset of ultrafine particles in the minute particles contained in the air Eb adheres to the cells 641 in the honeycomb structure member 64 to be trapped by the cells 641.

Thus, the air Ec that has passed through the first filter 63 reduces ultrafine particles therein than in the air Eb that has not yet passed through the first filter 63.

The air Ec that has passed through the cells 641 in the honeycomb structure member 64 has its flow direction corrected further than the flow direction of air Eb that has not yet passed through the first filter 63. Specifically, the flow direction of the air Ec is corrected as a result of passing through the first filter 63.

More specifically, the air Eb that has not yet passed through the first filter 63 varies in the direction of its flow, the flow rate, or its distributed quantity. However, after the air Eb passes through the first filter 63 having the honeycomb structure, the air Eb is formed into the air Ec having its flow direction substantially aligned, and the flow rate or the distribution substantially uniformized.

Subsequently, as illustrated in FIG. 3 or FIG. 4, the air Ec obtained after passing through the first filter 63 flows through the duct space 61*a* in the midstream portion 612 in the air duct 61 to be caused to pass through the second filter 66.

At this time, the air Ec collides against the nonwoven fabric 67 in the second filter 66 folded in a wave pattern, and then moves to pass through minute gaps in the nonwoven fabric 67.

As illustrated in FIG. 4, most of the air Ec moves to collide against the front surface of the second filter 66 while having its flow direction corrected by passing through the first filter 63. On the other hand, a subset of the air Ec is bent to spread toward the elongated side of the midstream portion 612 in the air duct 61, and moves to slightly obliquely collide against the elongated portion of the second filter 66 with the width W2.

The air Ec at this time passes through the duct space 61*a* in the midstream portion 612 that gradually expands from the duct space 61*a* in the upstream portion 611 in the air duct 61, and thus flows at a lower air flow rate than the flow rate of the air that has not yet passed through the second filter 66, in other words, the air Eb that has passed through the first filter 63. The air Ec passes through the nonwoven fabric 67 in the second filter 66 at a lower air flow rate.

Thus, a large number of ultrafine particles in the minute particles contained in the air Ec adhere to the nonwoven fabric 67 in the second filter 66 to be trapped by the nonwoven fabric 67. The air Ec that has passed through the first filter 63 passes through the second filter 66 at a lower flow rate. This also enhances the efficiency of trapping ultrafine particles.

Thus, the air Ed that has passed through the second filter 66 significantly reduces ultrafine particles than the air Ec that has not yet passed through the second filter 66.

Finally, as illustrated in FIG. 3 or FIG. 4, after the air Ed that has passed through the second filter 66 moves through the air-current producing member 62, the air Ed is formed into air Ee to be discharged to the outside from the air outlet 12 in the housing 10 in the image forming apparatus 1.

Test to Examine Trapping Effect

Subsequently, a test conducted to examine the trapping effect of the trapping device 6 will be described.

The test is conducted in conformity with the test standard (RAL-UZ205) of the blue angel mark or a German environmental label.

More specifically, the test is conducted in the following manner. On a table placed in a space of a test chamber serving as a highly airtight test environment chamber, the image forming apparatus 1 including the trapping device 6 to be measured is installed and balanced. Then, the image forming apparatus 1 is activated to perform a predetermined image forming operation for one minute, and the quantity of ultrafine particles (UFPs) contained in air in the chamber during the image forming operation and within a predetermined time period after the operation stop is measured.

Ultrafine particles are measured with a measurement device (a condensed particle counter CPC Mode13775 manufactured by TSI Incorporated). In test T1, the test chamber is set to a predetermined indoor environment (at a temperature of 23° C., and a humidity of 50% RH).

The test chamber has an interior with its capacity of, for example, 5.1 m³. Clean air is provided from an air inlet to the interior, and interior air is discharged from an air outlet. The interior air discharged from the test chamber is transported to the connected measurement device.

Figure 6A:
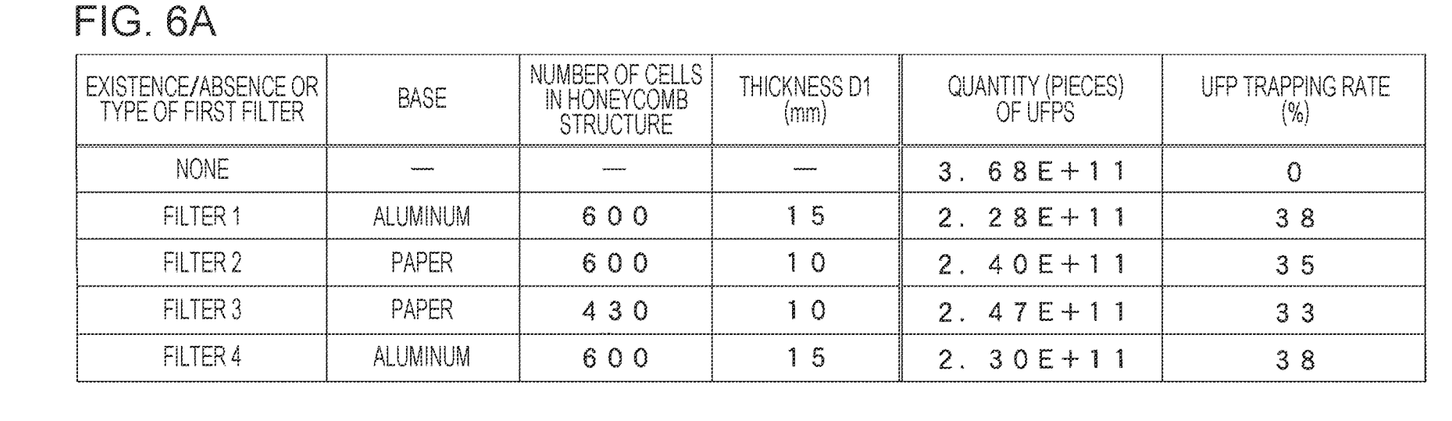
FIG. 6A is a table showing the results of a test conducted to examine the quantity of ultrafine particles.

The image forming apparatus 1 to be measured includes the trapping device 6 including only one of multiple first filters 63 with the structure specified in FIG. 6. Paper forming the base of the first filters illustrated in FIG. 6 is made of inorganic fiber paper.

As a comparative example of an image forming apparatus, a trapping device not including the first filter 63, that is, a trapping device only including the air duct 61 and the air-current producing member 62 is prepared.

As illustrated in FIG. 4 or FIGS. 5A and 5B, an air duct at least including the upstream portion 611 having the duct space 61a with a height H of 90 mm and a width W1 of 90 mm and the midstream portion 612 having the duct space 61a with a height H of 90 mm and a width (W1+W2) of 186 mm is used as the air duct 61 in the trapping device 6.

In addition, the axial-flow fan 62A is used as the air-current producing member 62. The axial-flow fan 62A is driven to rotate at an airflow rate of 0.33 m³/min on the side of the first filter 63 from which air flows in (on the upstream side).

The trapping device 6 is operated for a period from the start to the stop of the image forming operation in the test.

The image formed in the image forming operation is a chart having an image area rate of 5% specified by the blue angel (BA). A device that performs a fixing operation at a fixing heating temperature of 150 to 180° C. is used as an example of the fixing device 5. Toner formed from resin, pigment, or wax particles is used as an example of toner.

Figure 6B:
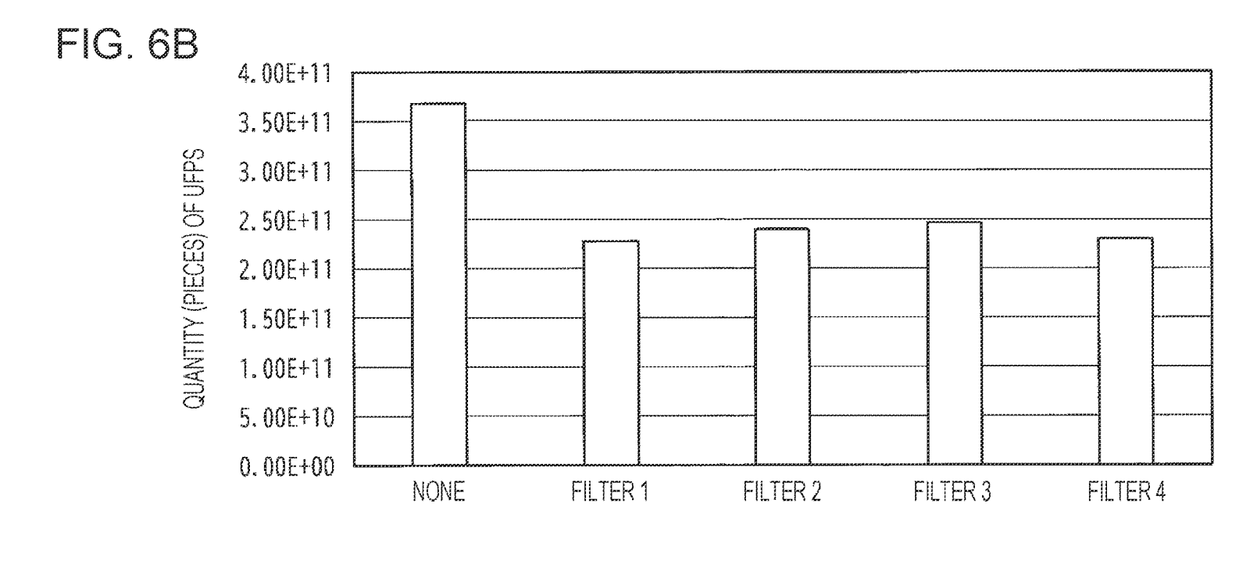
FIG. 6B is a graph showing the relationship between the first filter and the quantity of ultrafine particles in the test results in FIG. 6A.

This test is conducted to examine the quantity of UFPs. FIG. 6B shows the results of this test.

The results shown in FIG. 6B reveal that the trapping device 6 only including the first filter 63 having a honeycomb structure (not including the second filter 66) traps ultrafine particles to some extent. The results also reveal that the first filter 63 formed from paper has the effect of trapping ultrafine particles on the level approximate to that of the effect of the first filter 63 formed from aluminum.

Regardless of when including the first filter 63 and the second filter 66, the trapping device 6 used in this test reduces the pressure drop or reduces occurrences of noise or power consumption in the axial-flow fan 62A.

In this test, the quantity of UFPs is similarly examined multiple times for an image forming apparatus including a trapping device only including the second filter 66 (not including the first filter 63) as an example of the trapping device 6.

As an example of the second filter 66, a wavily folded nonwoven fabric with a thickness of 1.5 mm and formed from filaments is used. Each wave in the fold formed at this time has an entire thickness D2 of 19 mm, with a width on one surface of the fold (the dimension along the surface from the mountain 67a to the valley 67b) of approximately 19 mm, and a distance (folding pitch) from the mountain 67a and the valley 67b in each fold in a direction along the virtual plane VS2 of approximately 2 mm.

The UFP trapping rate of the trapping device 6 including only the second filter is 77 to 84% on the average.

In this test, when the airflow rate of the axial-flow fan 62A on the side of the second filter 66 from which air flows in (on the upstream side) is changed from "0.33 m³/min" to, for example, "0.65 m³/min", the UFP trapping rate of substantially the same level as that of the UFP trapping rate before the airflow rate is changed is obtained.

In this test, the quantity of UFPs is similarly examined for an image forming apparatus including a trapping device including a combination of one of four first filters illustrated in FIG. 6A and the second filter used in the test, as an example of the trapping device 6.

The trapping device 6 including a combination of a corresponding one of the first filters and the second filter has a UFP trapping rate of 90 to 97%.

MODIFICATION EXAMPLE

Although the exemplary embodiments of the present disclosure have been described above, the present disclosure is not limited to the above exemplary embodiment, and may be modified or embodied in various manners within the scope not departing from the gist of the disclosure. Thus, the present disclosure also includes, for example, modification examples described later.

Figure 7:
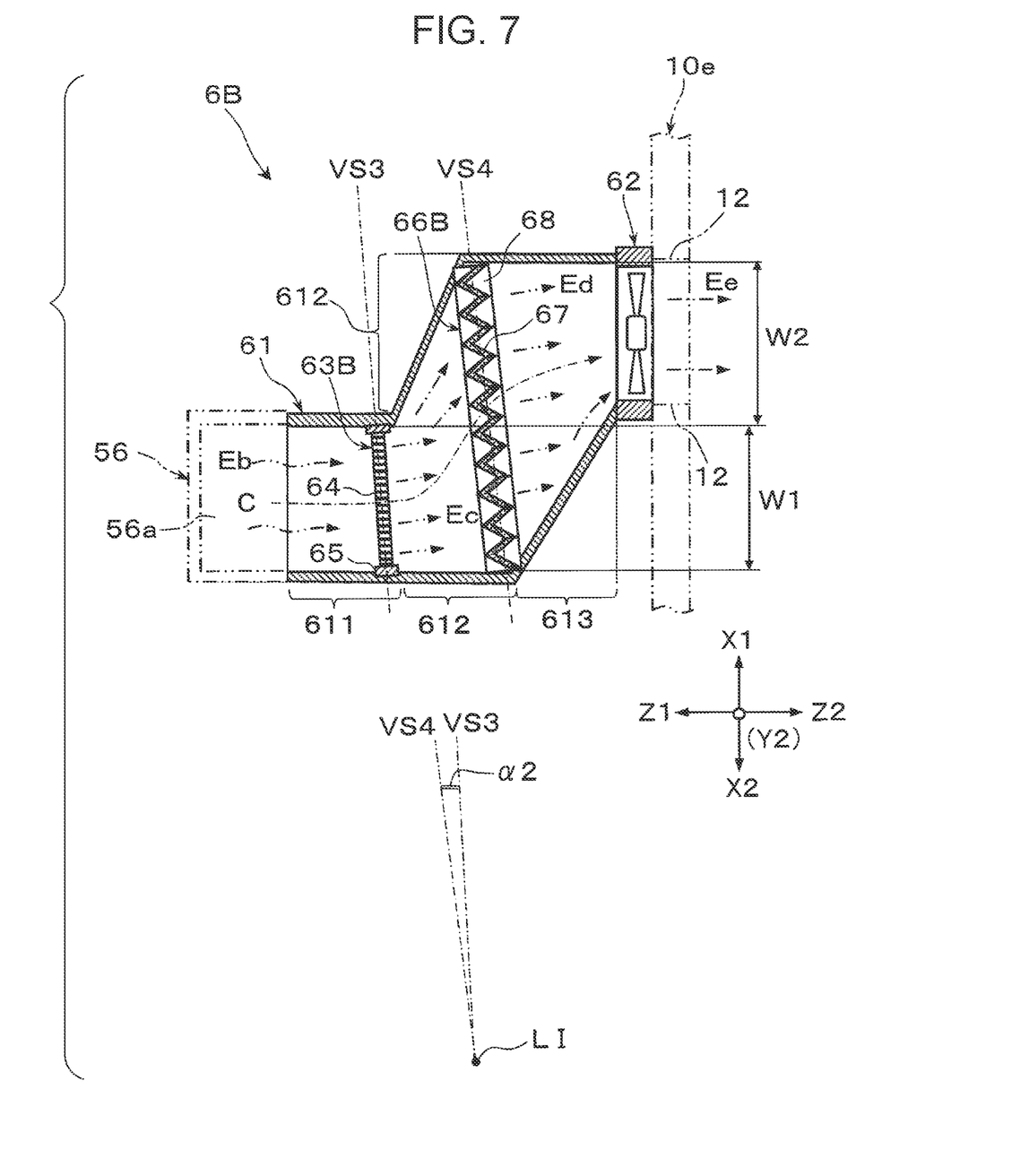
FIG. 7 is a schematic diagram of an arrangement of a first filter and a second filter according to a modified example viewed from the top.

Unlike in the air duct 61 according to the first exemplary embodiment, the first filter 63 and the second filter 66 in the trapping device 6 may be arranged similarly to a first filter 63B and a second filter 66B in a minute-particle trapping device 6B illustrated in FIG. 7.

Specifically, the first filter 63B according to this modification example is disposed at the downstream end of the duct space 61a extending straight in the upstream portion 611 in the air duct 61 to be slightly inclined to face the elongated side of the midstream portion 612 in the air duct 61. More specifically, as illustrated in FIG. 7, the first filter 63B is disposed to be in a position to have the end (right end) in the right direction indicated with arrow X2 slightly shifted further to the rear side indicated with arrow Z2 than the end (left end) in the left direction indicated with arrow X1.

The second filter 66B according to this modification example is disposed at the downstream end of the duct space 61a in the midstream portion 612 in the air duct 61 to be inclined to follow the inclined position of the first filter 63B within a possible range. More specifically, as illustrated in FIG. 7, compared to the positioning of the second filter 66 according to the first exemplary embodiment (FIG. 4), the second filter 66B is disposed to have the end (right end) in the right direction indicated with arrow X2 slightly shifted to the rear indicated with arrow Z2 and to have the end (left end) in the left direction indicated with arrow X1 slightly shifted to the front indicated with arrow Z1.

As illustrated in FIG. 7, the first filter 63B and the second filter 66B are arranged to have such as relationship that, when virtual planes VS3 and VS4 extending through the centers of the first filter 63B and the second filter 66B according to the modification example in the thickness directions are translated in parallel toward each other, the virtual planes VS3 and VS4 form a crossing angle α2 of greater than or equal to 5° and smaller than or equal to 15° (absolute value).

In other words, in this modification example, the second filter 66B is disposed at the downstream end of the duct space 61a in the midstream portion 612 in the air duct 61 to be as parallel to the inclined first filter 63B as possible or to form the crossing angle α2 within a smallest possible angle range.

In the trapping device 6B according to the modification example, the air Ec that has its flow direction corrected by passing through the first filter 63B flows along the inclined first filter 63B, flows to spread toward the elongated side of the second filter 66B, and passes through the second filter 66B. Compared to the case of the trapping device 6 according to the first exemplary embodiment, the air Ec that has passed through the first filter 63B flows through the second filter 66B at a larger contact angle or flows through the second filter 66B in a direction approximately perpendicular to the front surface of the second filter 66B.

Thus, the trapping device 6B traps more ultrafine particles than the trapping device 6 according to the first exemplary embodiment.

Figure 8A:
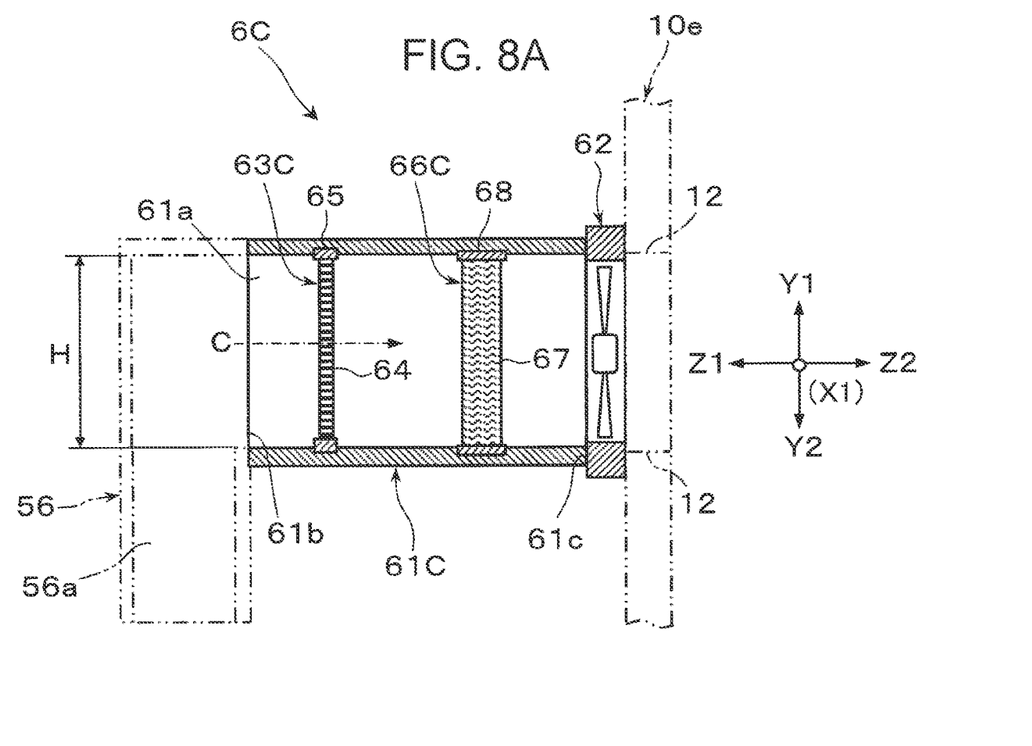
FIG. 8A is a schematic diagram of an air duct according to a modification example when viewed from a side.
Figure 8B:
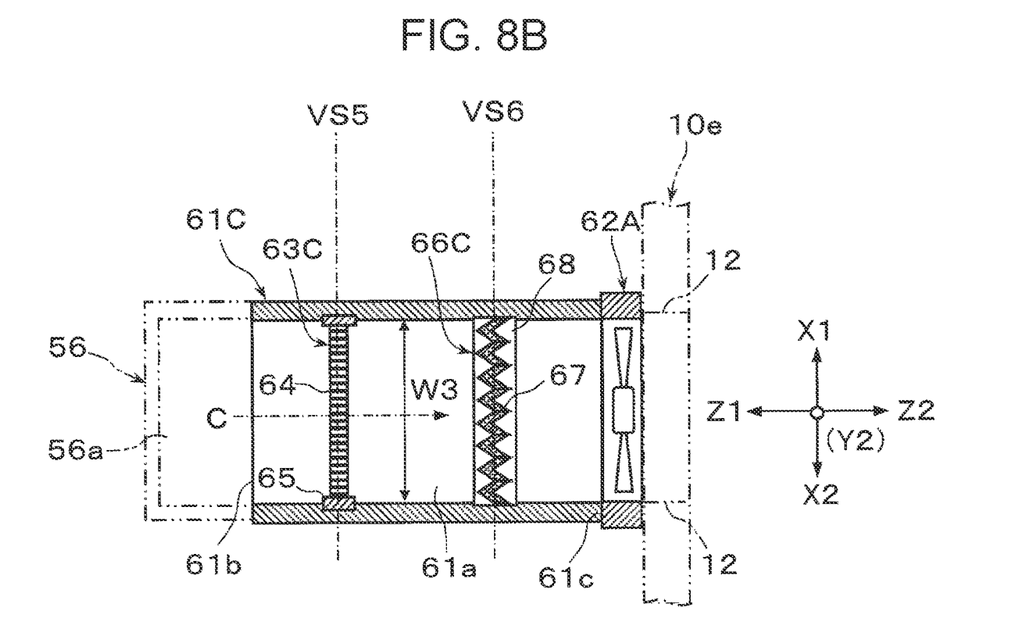
FIG. 8B is a schematic diagram of the air duct illustrated in FIG. 8A when viewed from the top.

Instead of the trapping device 6 including the air duct 61, a trapping device 6C including an air duct 61C having a shape illustrated in FIGS. 8A and 8B may be used.

The air duct 61C illustrated in FIGS. 8A and 8B is a tubular structure entirely extending substantially straight from the first end portion 61b to a second end portion 61c. Specifically, an air duct 61C has the duct space 61a with a substantially uniform height H, and with a width W from the first end portion 61b to the second end portion 61c of a substantially uniform dimension W3.

As illustrated in FIGS. 8A and 8B, a first filter 63C and a second filter 66C are arranged to have such a relationship that, when virtual planes VS5 and VS6 that extend through the centers of the first filter 63C and the second filter 66C in the trapping device 6C according to this modification example in the respective thickness directions are translated in parallel toward each other, the virtual planes VS5 and VS6 form a crossing angle α of substantially 0°.

When, for example, the trapping device 6 is combined with a vent member including a device such as an exhaust fan for producing air currents, the trapping device 6 may eliminate the air-current producing member 62.

Instead of the axial-flow fan 62A described as an example of the air-current producing member 62 according to the first exemplary embodiment, a centrifugal air blower such as a sirocco fan may be used as an example.

The first exemplary embodiment has described a case where the minute-particle trapping device 6 is used as a trapping device that traps minute particles in air containing ultrafine particles produced by the fixing device 5 in the image forming apparatus 1. However, the minute-particle trapping device 6 may be used as a trapping device that traps ultrafine particles while being disposed at a vent member that collects and discharges air containing minute particles produced by components in the image forming apparatus 1 other than the fixing device 5.

The minute-particle trapping device according to an exemplary embodiment of the present disclosure may be installed in any of various devices other than an image forming apparatus to trap ultrafine particles.

Instead of the image forming apparatus 1 that forms monochrome images as described in the first exemplary embodiment, an image forming apparatus including the minute-particle trapping device 6 may be an image forming apparatus that forms multicolor images.

The image forming apparatus including the trapping device 6 may be an image forming apparatus that operates in an image forming method other than the electrophotographic system. Examples of an image forming method other than the electrophotographic system include a droplet injection method and a printing method.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A minute-particle trapping device, comprising:
an air duct having a duct space through which air containing minute particles flows;
a first filter disposed to block the duct space in the air duct and having a honeycomb structure to trap the minute particles contained in the air; and
a second filter disposed in the air duct at a position downstream from the first filter in an air flow direction to block the duct space, the second filter being formed from a nonwoven fabric folded in a wave pattern to trap minute particles contained in the air that has passed through the first filter.

(((2)))

The minute-particle trapping device according to (((1))), wherein the first filter and the second filter are arranged to have such a relationship that, when virtual planes extending through centers of the first filter and the second filter in respective thickness directions are translated in parallel toward each other, the virtual planes form a cross angle of greater than or equal to 0° and smaller than or equal to 30°.

(((3)))

The minute-particle trapping device according to (((1))) or (((2))), comprising:

an air-current producing member that produces an air current in the air flow direction in the duct space in the air duct, wherein the air-current producing member is disposed downstream from the second filter in the air duct in the air flow direction.

(((4)))

The minute-particle trapping device according to any one of (((1))) to (((3))), wherein the duct space in the air duct from the first filter to the second filter has a cross section that expands further toward the second filter.

(((5)))

The minute-particle trapping device according to (((4))), comprising:

an air-current producing member that produces an air current in the duct space in the air duct in a direction in which the air is to be blown, wherein the duct space in the air duct from the first filter to the second filter has a cross section that expands to elongate the second filter further than the first filter in one direction beyond one end of the first filter, and wherein the air-current producing member is disposed downstream from the second filter in the air duct in the air flow direction and on an elongated side of the second filter while being misaligned with the first filter.

(((6)))

The minute-particle trapping device according to any one of (((1))) to (((5))), wherein the first filter is a plate-shaped member with a thickness of greater than or equal to 5 mm and smaller than or equal to 20 mm.

(((7)))

The minute-particle trapping device according to any one of (((1))) to (((6))), wherein the first filter has greater than or equal to 300 and smaller than or equal to 800 cells per square inch in the honeycomb structure.

(((8)))

The minute-particle trapping device according to (((7))), wherein the first filter is formed from paper.

(((9)))

An image forming apparatus, comprising:

a vent member that collects and discharges air in an apparatus body, wherein the minute-particle trapping device according to any one of (((1))) to (((8))) is disposed in the vent member.

(((10)))

The image forming apparatus according to (((9))), comprising:

a fixing member that fixes, with heat, an unfixed toner image on a recording medium; and a first vent member that collects and discharges air in the fixing member, the first vent member serving as the vent member, wherein the minute-particle trapping device is disposed in the first vent member.

What is claimed is:

1. A minute-particle trapping device, comprising:
an air duct having a duct space through which air containing minute particles flows;
a first filter blocking the duct space in the air duct and having a honeycomb structure to trap minute particles contained in the air;
a second filter in the air duct downstream from the first filter in an air flow direction and blocking the duct space, the second filter comprising a nonwoven fabric folded in a wave pattern to trap minute particles contained in the air that have passed through the first filter; and
an air-current producing member configured to produce an air current in the duct space in the air duct in a direction in which the air is to be blown, wherein
the duct space in the air duct from the first filter to the second filter has a cross section that expands further toward the second filter,
the duct space in the air duct from the first filter to the second filter has a cross section that expands to elongate the second filter further than the first filter in one direction beyond one end of the first filter, and
the air-current producing member is downstream from the second filter in the air duct in the air flow direction, on an elongated side of the second filter and misaligned with the first filter.

2. The minute-particle trapping device according to claim 1, wherein the first filter and the second filter have virtual planes extending through centers of the first filter and the second filter in respective thickness directions that form a cross angle of greater than or equal to 0° and smaller than or equal to 30°.

3. The minute-particle trapping device according to claim 1, comprising:
an air-current producing member configured to produce an air current in the air flow direction in the duct space in the air duct,
wherein the air-current producing member is downstream from the second filter in the air duct in the air flow direction.

4. The minute-particle trapping device according to claim 1, wherein the first filter is a plate-shaped member with a thickness of greater than or equal to 5 mm and smaller than or equal to 20 mm.

5. The minute-particle trapping device according to claim 1, wherein the first filter has greater than or equal to 300 and smaller than or equal to 800 cells per square inch in the honeycomb structure.

6. The minute-particle trapping device according to claim 5, wherein the first filter is formed from paper.

7. An image forming apparatus, comprising:
a vent member that collects and discharges air in an apparatus body,
wherein the minute-particle trapping device according to claim 1 is in the vent member.

8. An image forming apparatus, comprising:
a vent member that collects and discharges air in an apparatus body,
wherein the minute-particle trapping device according to claim 2 is in the vent member.

9. An image forming apparatus, comprising:
a vent member that collects and discharges air in an apparatus body,
wherein the minute-particle trapping device according to claim 3 is in the vent member.

10. An image forming apparatus, comprising:
a vent member that collects and discharges air in an apparatus body,
wherein the minute-particle trapping device according to claim 4 is in the vent member.

11. An image forming apparatus, comprising:
a vent member that collects and discharges air in an apparatus body,
wherein the minute-particle trapping device according to claim 5 is in the vent member.

12. An image forming apparatus, comprising:
a vent member that collects and discharges air in an apparatus body,
wherein the minute-particle trapping device according to claim 6 is in the vent member.

13. The image forming apparatus according to claim 7, comprising:
a fixing member that fixes, with heat, an unfixed toner image on a recording medium; and
the vent member, which collects and discharges air in the fixing member,
wherein the minute-particle trapping device is in the vent member.

14. The image forming apparatus according to claim 8, comprising:
a fixing member that fixes, with heat, an unfixed toner image on a recording medium; and
the vent member, which collects and discharges air in the fixing member,
wherein the minute-particle trapping device is in the vent member.

15. The image forming apparatus according to claim 9, comprising:
a fixing member that fixes, with heat, an unfixed toner image on a recording medium; and
the vent member, which collects and discharges air in the fixing member,
wherein the minute-particle trapping device is in the vent member.

\* \* \* \* \*